Nov. 25, 1924.

W. W. McNAUGHTON

ANTISKIDDING DEVICE

Filed Dec. 17, 1923

INVENTOR
William W. McNaughton
BY
*[signature]*
ATTORNEY

Nov. 25, 1924.

W. W. McNAUGHTON

ANTISKIDDING DEVICE

Filed Dec. 17, 1923

INVENTOR
William W. McNaughton
BY
Fredk C. Fischer
ATTORNEY

Patented Nov. 25, 1924.

1,516,823

UNITED STATES PATENT OFFICE.

WILLIAM W. McNAUGHTON, OF NEWARK, NEW JERSEY, ASSIGNOR OF ONE-HALF TO FREDERICK C. FISCHER, JR., OF NEWARK, NEW JERSEY.

ANTISKIDDING DEVICE.

Application filed December 17, 1923. Serial No. 681,118.

*To all whom it may concern:*

Be it known that I, WILLIAM W. Mc-NAUGHTON, a citizen of the United States, and a resident of Newark, in the county of Essex and State of New Jersey, have invented certain new and useful Improvements in Antiskidding Devices, of which the following is a specification.

This invention relates to non-skidding devices as applied to the tires of self-propelled vehicles and particularly to such as have rubber treads, prone to slip on wet surfaces, caused by rain, snow or ice, thereby rotating by the power transmitted to them but failing to propel the vehicle.

The principal object of the invention is to provide a device that, when applied to the wheel, will cause a frictional gripping or tractive effect, irrespective of surface conditions and positively move the vehicle in the direction of rotation of the wheel.

Another purpose is to produce a device that can be easily applied to any convenient part of the wheel with a minimum of physical effort and which can be engaged entirely independent of the use of tools or appliances of any sort and further, without compelling the person applying the device to assume an uncomfortable or awkward position.

A further aim is in the provision of a simple device that is relatively light in weight, so flexible as to permit folding into a small compact package and which is so constructed as to avoid abrasion or other damage to the wheel.

These and other like objects, such as cheapness, economical construction and ready renewal of worn parts, are accomplished by the novel construction, combination and arrangement of parts hereinafter described and shown in the accompanying drawings, forming a material portion of this disclosure, and in which:—

Figure 1:
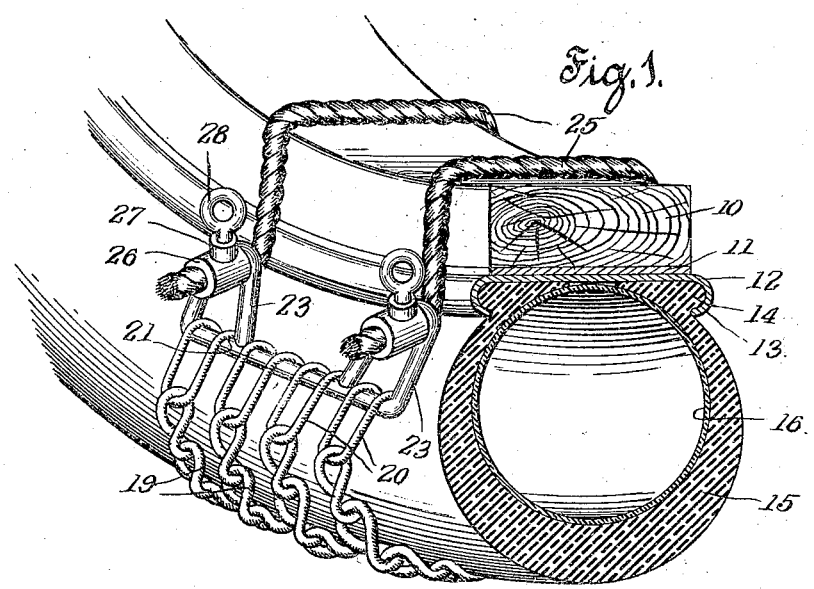
Figure 1 is a perspective view showing the application of a preferred embodiment of the invention to a conventional type of wheel and tire.
Figure 2:
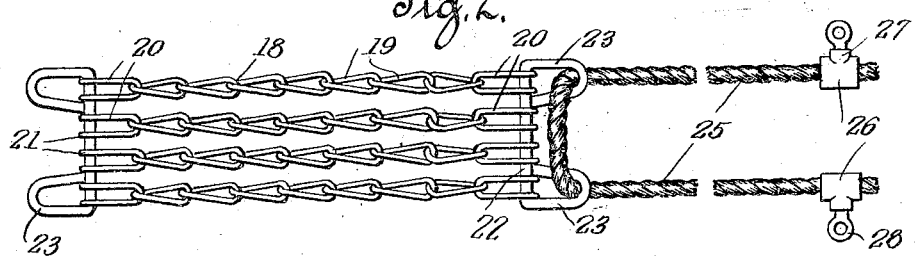
Figure 2 is a plan view of the device as extended flat and drawn to a decreased scale.
Figure 3:
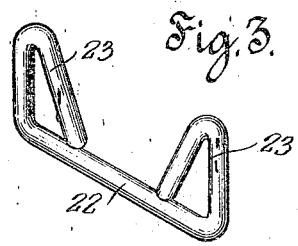
Figure 3 is a perspective view of the end link connecting element.

Referring more in detail to the drawings, particularly to Figures 1, 2 and 3 the numeral 10 designates the felly of a common type of vehicle wheel, encircled by a metal band 11 over which is disposed a channelled rim 12 having open beaded edges 13 receptive of the tire elements 14 integral with the tread or shoe 15 which contains an inner inflatable tube 16, this construction being of the usual well known type.

The invention, which as before stated, is to prevent the tire tread from turning unavailingly without advancing the vehicle and at the same time from moving laterally on a slippery surface, is composed of a series of metal chains generally designated by the numeral 18, each consisting of a plurality of links 19 of any approved shape.

The end links of each chain are engaged in loops 20 having tightly coiled eyes 21 loosely surrounding rods 22 turned out at a right angle at their ends and again reentrantly forming closed loops 23 disposed in parallel and normally extending oppositely outward.

The length of the chains is so proportioned that the rods 22 will become located beyond or exterior to the beading 13 on each side of the tire as indicated in Figure 1, thus avoiding frictional metallic contact with the surface of the felly to prevent abrading the same.

A relatively soft but strong rope 25 is passed through the bights of the loops 23, its extending ends, which are of substantially equal length, normally passing over the inner surfaces of the felly 10, and through the loops at the opposite end of the chain.

Suited to engage on the rope ends are sleeves 26 provided with side bosses 27 carrying thumb clamp screws 28.

In this simple device the rope's ends are pulled as taut as possible, the sleeves slipped on and the set screws tightened, the inner ends of the sleeves abutting loop bights and holding the rope ends from loosening.

Figure 4:
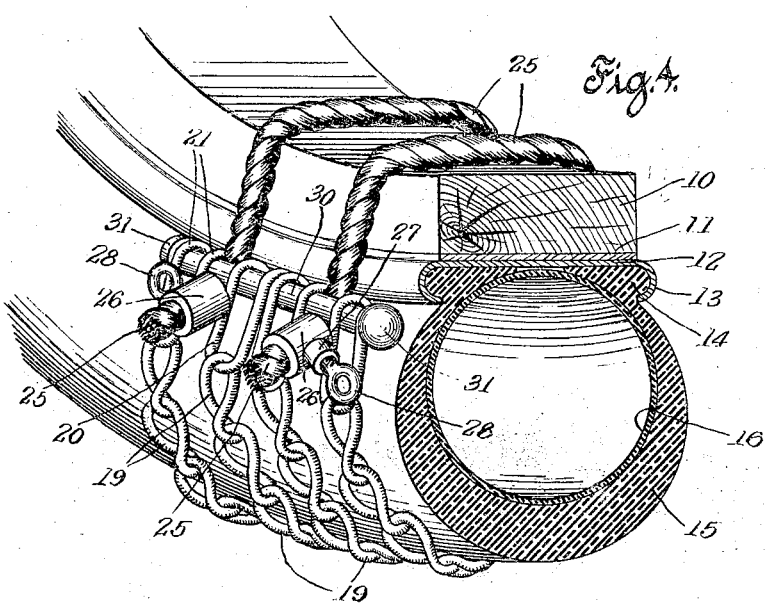
Figure 4 is a perspective view similar to Figure 1 but showing a modified type of attaching means.

In the modification shown in Figure 4, the eyes or bights of the loops 20 at one end of the structure are engaged on a rod 30 having knobbed ends 31; the rope 25 is secured to the other end of the device by passing through the rear loops 20 (not shown) or in any other preferred manner, its ends entered below the opposite rod, between the outer loops and those next adjacent, drawn tightly and thereafter the sleeve 26 applied in the manner before described.

Figure 5:
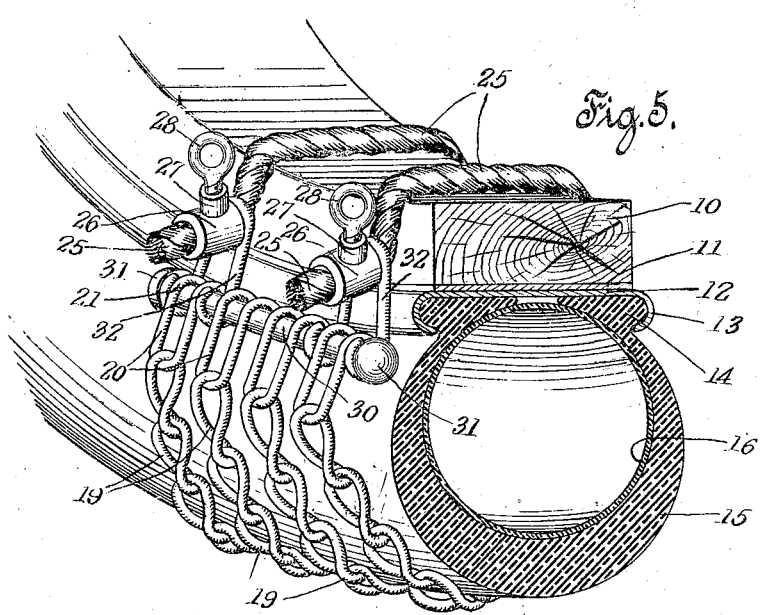
Figure 5 is another like view illustrating a further adaptation of the device.

Figure 5 illustrates a similar device using the rods 30 connected in the foregoing manner, and in addition, a pair of spaced metal loops 32 having their ends coiled about the rod to freely pivot on it and the rope ends are passed through the bights of the loops to receive the clamp sleeves 26 in the manner previously described.

Due to the extreme flexibility of the device it admits of application at any convenient point on the periphery of the wheel, tending to tighten when in use, and obviously, as many of the devices may be applied to a wheel as are desired.

Although the foregoing is descriptive of embodiments of the invention it will be apparent that minor changes may be made in its construction, without the exercise of invention or conflicting with the scope of the claims hereto appended.

Having thus described my invention, what I claim as new and desire to secure by Letters Patent, is:—

1. A non-skid device comprising a series of chains arranged in spaced parallel relation, rods passing through the end members of each chain, a rope engaging one of said rods, the ends of said rope being adapted to pass over the felly of a wheel, and means on the other rod for securing the extremities of said rope.

2. A non-skid device for vehicle tires comprising a series of chains disposed transversely over a portion of the tire surfaces, rods engaged in the end links of each chain on each side of the tire, a rope secured midway its length to one of said rods and extending over the wheel felly, loops on the opposite rod through which the ends of said rope are passed, said rope acting as a cushion preventing abrasion of the felly, and means for clamping said rope ends in adjustment.

3. A non-skid device for vehicle tires comprising a series of chains disposed over the tire surface, each chain consisting of a plurality of flexibly connected links, looped members at the ends of said chains, said looped members having terminal coils, rods engaged in said coils, a relatively soft rope attached at the center of its length near the ends of one of said rods, said rope being suited to pass over the wheel felly, and loops on the other rod, said rope being passed through said loops and secured therebeyond.

4. A non-skid device for vehicle tires comprising a series of chains transversely disposed over a portion of the tire surface, rods engaged in the end links of each chain on each side of the tire, said rods having loops near their ends, a rope engaging the loops of one of said rods and extending over the inner surface of the wheel felly to engage the loops of the opposite chain rod, sleeves adjustable on the extending ends of said rope, said sleeves preventing retraction of the rope, and means for clamping said sleeves in adjustment.

5. A non-skid device for vehicle tires comprising a series of chains transversely disposed over the tire surface, rods engaged in the end links of each chain on each side of the tire, said rods having integrally looped ends, a rope engaging the loops of one of said rods and extending over the inner surface of the wheel felly to pass through the loops on the opposite rod, sleeves on the extending end of said rope abutting said loops, and means for securing said sleeves in adjustment.

6. A non-skid device for vehicle tires comprising a series of chains transversely disposed over the tire surface, rods engaged in the end links of each chain on each side of the tire, said rods having integrally looped ends, and securing means adapted to engage the loops of one of said rods and extending over the inner surface of the wheel felly to pass through the loops on the opposite rod.

This specification signed and witnessed this 14th day of December, 1923.

WILLIAM W. McNAUGHTON.

Witnesses:
FERDINAND NOLL,
FRED'K C. FISCHER.